(12) United States Patent
Dubey et al.

(10) Patent No.: US 9,701,268 B2
(45) Date of Patent: Jul. 11, 2017

(54) BIRDS BEAK BRACKET SYSTEM

(71) Applicant: FORD GLOBAL TECHNOLOGIES, LLC, Dearborn, MI (US)

(72) Inventors: Prashant Dubey, Oakland, CA (US);
Flondezi Godette, Saline, MI (US);
Irfan Sharif, Canton, MI (US);
Vincent S. Carnes, White Lake, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 68 days.

(21) Appl. No.: 14/743,096

(22) Filed: Jun. 18, 2015

(65) Prior Publication Data

US 2016/0368442 A1 Dec. 22, 2016

(51) Int. Cl.
*B60R 19/52* (2006.01)
*B62D 27/02* (2006.01)
*B62D 25/08* (2006.01)
*F16B 5/06* (2006.01)
*B60R 19/18* (2006.01)

(52) U.S. Cl.
CPC .............. *B60R 19/52* (2013.01); *B60R 19/18* (2013.01); *B62D 25/085* (2013.01); *B62D 27/023* (2013.01); *F16B 5/0607* (2013.01); *B60R 2019/1886* (2013.01); *B60R 2019/525* (2013.01)

(58) Field of Classification Search
CPC .............. B60R 19/24; B60R 2019/247; B60R 13/0206; B60R 19/52; B60R 2019/525; B60R 19/18; B60R 2019/1886; B62D 25/085; B62D 27/023
See application file for complete search history.

(56) References Cited

U.S. PATENT DOCUMENTS

| | | | |
|---|---|---|---|
| 6,010,169 | A | 1/2000 | Cox et al. |
| 6,997,586 | B2 | 2/2006 | Lee |
| 8,104,827 | B2 | 1/2012 | Crane et al. |
| 8,505,995 | B2 | 8/2013 | Meyers et al. |
| 2014/0192549 | A1* | 7/2014 | Townson ............. B62D 25/085 362/548 |
| 2014/0353991 | A1 | 12/2014 | Kim |

FOREIGN PATENT DOCUMENTS

EP    2228265 B1    10/2012

* cited by examiner

*Primary Examiner* — Glenn Dayoan
*Assistant Examiner* — Melissa A Black
(74) *Attorney, Agent, or Firm* — Jason Rogers; King & Schickli PLLC

(57) ABSTRACT

An attachment system for connecting a vehicle fascia birds beak element to a vehicle front end module bolster includes a bracket having a fascia-engaging portion and a bolster-engaging portion. The bolster-engaging portion includes one or more bracket locator structures configured for engaging cooperating structures disposed on the bolster to self-orient the bracket in a predetermined orientation. The system further includes a vehicle front end module bolster having a bracket-engaging portion that includes one or more bolster locator structures configured for engaging cooperating structures disposed on the bracket to self-orient the bracket in the predetermined orientation.

18 Claims, 7 Drawing Sheets

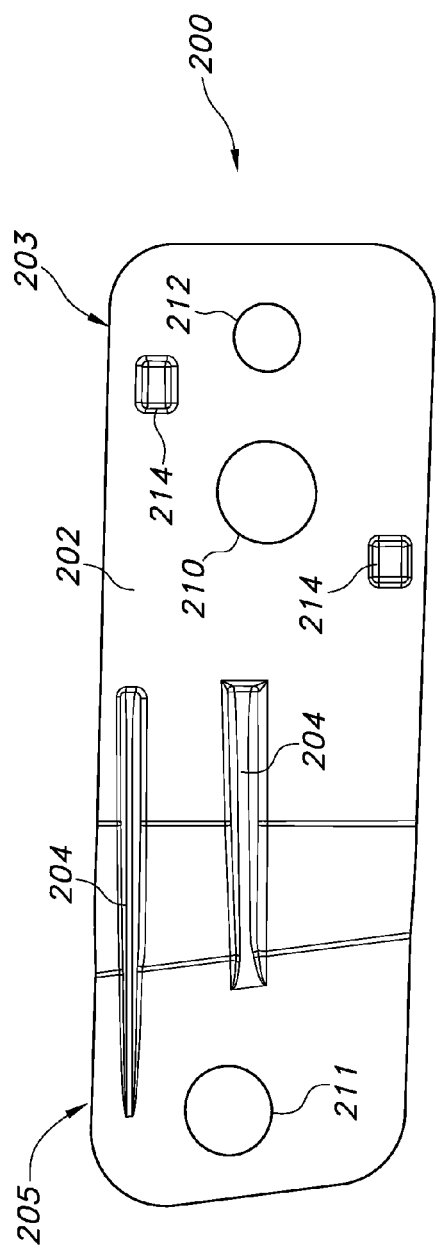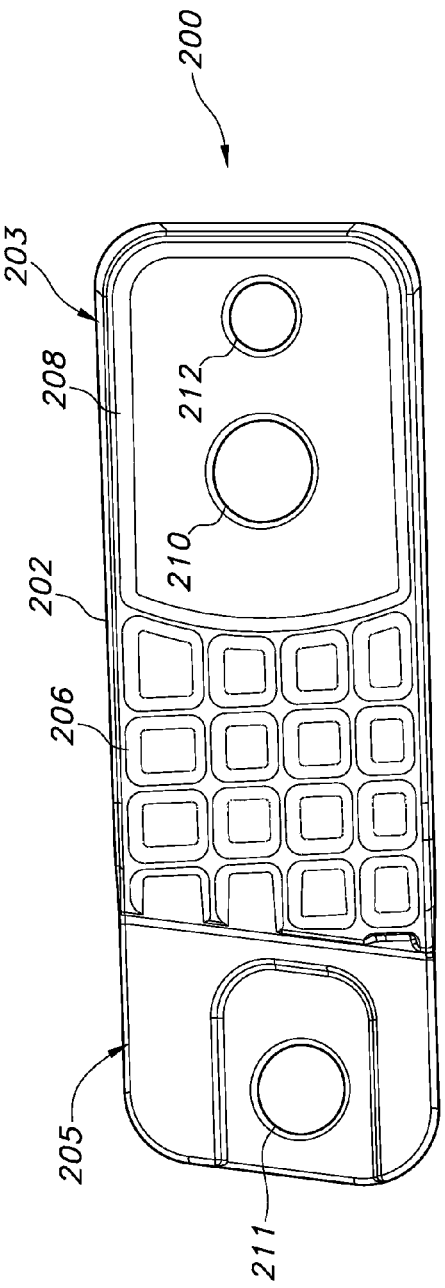

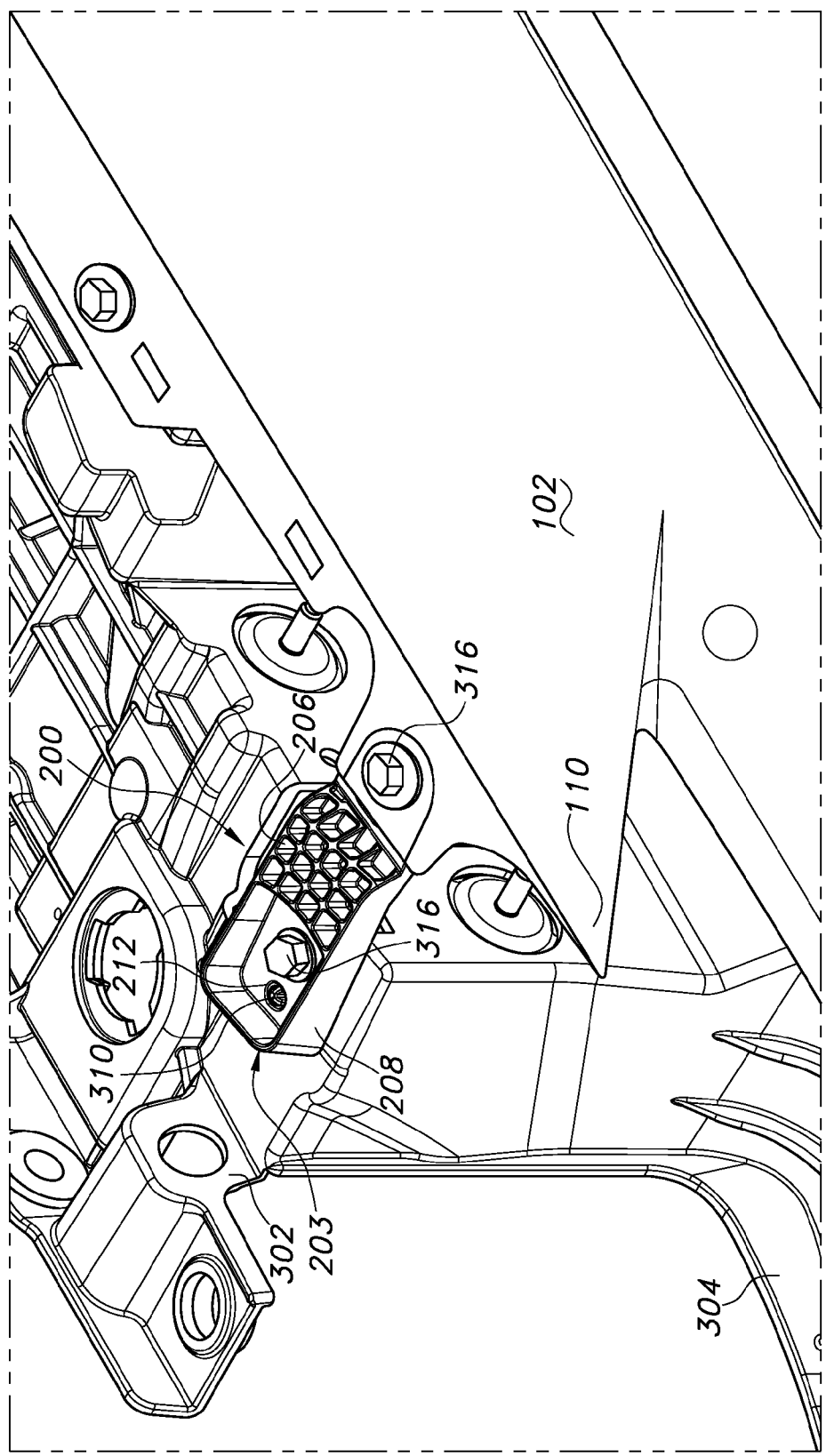

BIRDS BEAK BRACKET SYSTEM

TECHNICAL FIELD

This disclosure relates generally to brackets for motor vehicle components, and more particularly to an improved fascia securing system for connecting vehicle components such as a vehicle fascia and a front end module bolster one to another.

BACKGROUND

It is industry practice during motor vehicle manufacture/assembly to provide various components of the vehicle in modular form. The modules are then connected one to another in the latter stages of vehicle assembly. As one non-limiting example, various components of a vehicle closest to the radiator are typically packaged into an assembly commonly called a front-end module. The front-end module includes a frame structure commonly referred to as a bolster, to which other components such as the vehicle grille assembly, etc. are secured. Typically, a fascia is also secured to some portion of the vehicle/vehicle frame in order to hide internal vehicle components, frame members, etc. to provide an aerodynamic front surface for the vehicle, and for aesthetic reasons. With reference to FIG. 1 showing a motor vehicle V front-end module 100, as shown a vehicle front fascia 102 is provided which borders and/or frames the vehicle hood 104, the vehicle grille assembly 106, and the vehicle headlamp assembly 108 (which typically includes a headlamp unit, a headlamp housing, and a headlamp cover as is known).

One of the engineering challenges faced during such assembly is ensuring a tight mating, i.e. a flush margin, between various components/modules and/or adjoining panels of a vehicle during and after assembly, for reasons of safety, aesthetics, and customer satisfaction. For example, during the assembly of a vehicle front end, as shown in FIG. 1 after assembly of the fascia 102 to the vehicle bolster (not visible in this view), seams (shown by arrows) are defined between the mating surfaces of the fascia 102 and the hood 104 and between the fascia 102 and the headlamp opening 108. A particular flushness of margin is typically required for the seam created between those mating surfaces, and any deviation from a perfect mating surface can create a mismatch. Mismatched or uneven seams between mating surfaces create aesthetic concerns and at least a perception of reduced quality of manufacture.

One area of particular difficulty in securing a fascia 102 to a vehicle V is the "birds beak" area 110 of the fascia, so named because of its configuration which resembles the shape of a birds beak. This portion of the fascia 102 must be secured to assist in providing a seam having a desired margin between the hood 104 and the headlamp assembly 108. However, the birds beak area 110 of course cannot be secured directly to the hood 104 since the hood must be opened/closed for engine maintenance and repair. In turn, while conventionally the fascia birds beak area 110 is coupled to some portion of the headlamp assembly 108, such coupling is difficult and results in inconsistencies in the flushness of the resulting seam. In turn, conventional methods for securing the birds beak area to the headlamp assembly, such as sonic welding, are expensive and can be caused to fail by the vibration incurred during normal vehicle operation.

To satisfy this identified need in the art, the present disclosure describes a fascia attachment system for fastening a birds beak area 110 of a fascia 102 to a vehicle bolster, and to brackets and bolsters comprising the system. Advantageously, by use of the described fascia attachment system the birds beak area 110 of the fascia can be decoupled from the headlamp assembly 108 but still secured to the vehicle in a manner providing a seam having a desired flushness of margin.

SUMMARY

In accordance with the purposes and benefits described herein, in one aspect a bracket for connecting a vehicle fascia element such as a "birds beak" portion to a vehicle front end module bolster is described, the bracket including a fascia-engaging portion and a bolster-engaging portion. The bolster-engaging portion includes one or more locator structures configured for engaging cooperating structures disposed on the bolster to self-orient the bracket in a predetermined orientation.

In embodiments, the locator structures include a locator through-bore configured for engaging a cooperating pin disposed on a portion of the bolster and one or more locator tabs disposed on a bottom surface of the bracket and configured for engaging one or more cooperating structures disposed on the vehicle bolster. One or more reinforcing structures may be included in the bracket body.

In another aspect, a vehicle front end module bolster is provided having a bracket-engaging portion comprising one or more locator structures configured for engaging cooperating structures disposed on a bracket to self-orient the bracket in a predetermined orientation. In embodiments, the locator structures include a locator pin configured for engaging a cooperating aperture of the bracket. One or more ribs may be included in the bracket-engaging portion, configured for restricting movement of the bracket in a Z direction.

In still another aspect, an attachment system for connecting a vehicle fascia birds beak element to a vehicle front end module bolster is provided, including a bracket and a vehicle front end module bolster as described above.

In the following description, there are shown and described embodiments of the disclosed fascia attachment system. As it should be realized, the system is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of a fascia attachment system for securing a vehicle fascia birds beak area to a vehicle bolster, and together with the description serve to explain certain principles thereof. In the drawing:

FIG. 2A shows a bottom view of a passenger side bracket for use in a fascia securing system according to the present disclosure;

FIG. 2B shows a top view of the bracket of FIG. 2A;

FIG. 4 shows the bracket of FIGS. 2A-2C attaching the bolster of FIG. 3A to a birds beak area of the fascia of FIG. 1.

Reference will now be made in detail to embodiments of the disclosed fascia securing system, examples of which are illustrated in the accompanying drawing figures.

DETAILED DESCRIPTION

To solve the aforementioned and other problems, the present disclosure at a high level relates to a fascia attachment system comprising at least a bracket and a vehicle bolster. A bracket is described, including various reinforcing features which provide a bracket having good load-bearing capacity. As will be described, the bracket further includes various self-location features for self-locating the bracket on corresponding features of the bolster, and in the event of full and/or partial removal of the bracket from the bolster for servicing, for allowing easy relocation of the bracket back on the proper portion of the bolster.

Figure 1:
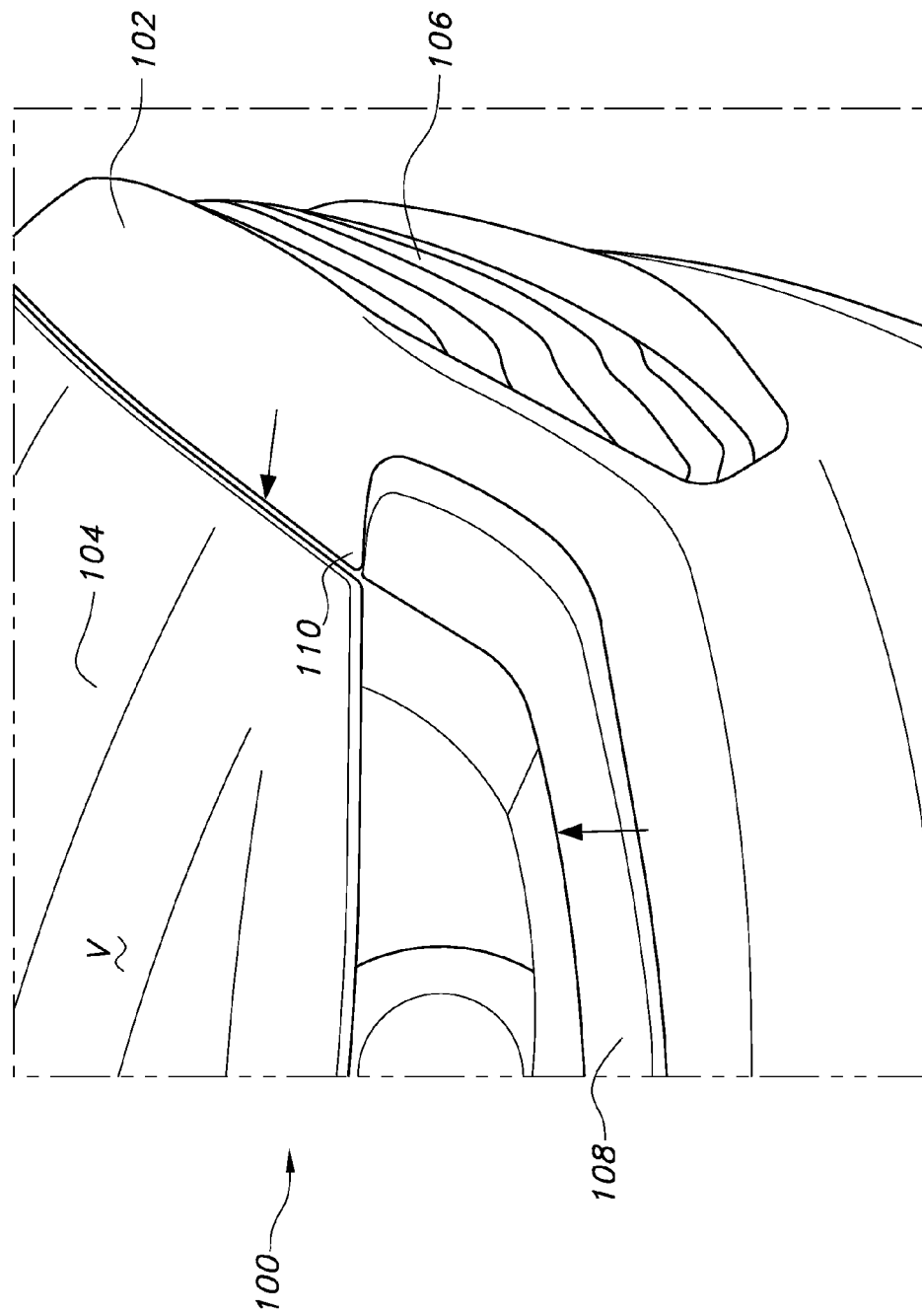
FIG. 1 depicts a prior art vehicle front end module including a fascia.
Figure 2C:
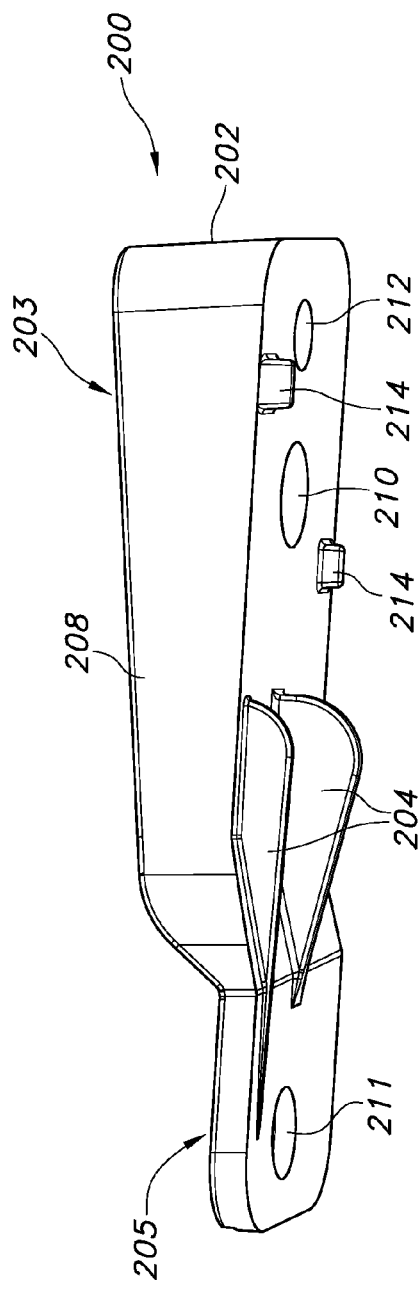
FIG. 2C shows a side view of the bracket of FIG. 2A.

With reference to FIGS. 2A-2C, an embodiment of a reinforced bracket 200 is shown. Preliminarily, a number of suitable materials for manufacturing such brackets are known in the art, including polymers such as glass-filled polypropylene (30%) and others. However, any suitable material for fabricating/molding brackets according to the present description is contemplated. Accordingly, any such descriptions should not be taken to be limiting in any way.

The bracket 200 includes a body 202 including a bolster-engaging portion 203 and a fascia-engaging portion 205. Body 202 could of course be fabricated or molded to be a solid piece. However, for reasons of weight, a plurality of reinforcing features are included or molded into the body 202. For example, as shown in FIG. 2A, one or more reinforcing ribs may be included or molded into a bottom surface of body 202. Likewise, reinforcing features are provided in a top surface of bracket 200. With reference to FIG. 2B, one such surface is a reinforced midsection 206, provided in the depicted embodiment by a "honeycomb" structure molded into the bracket 200 top surface. Of course, alternative structures such as additional ribs are contemplated for reinforced midsection 206. In turn, a side wall 208 is defined for body 202, which provides further strengthening structural support for the bracket 200.

The bracket body 202 further includes various locator and retention features, provided to allow the bracket 200 to substantially self-locate on and be secured to a vehicle bolster (not shown) as will be described infra. With particular reference to FIGS. 2A and 2B, one or more through-bores 210, 211 are provided in bolster-engaging portion 203 and fascia-engaging portion 205, for receiving fasteners such as bolts, screws, etc. A locator receiver 212, in the depicted embodiment also being a through-bore, is also provided in bolster-engaging portion 203, the function of which will be described infra. Of course, alternative configurations for locator receiver 212 are possible and contemplated, such as an open-ended or closed-ended sleeve. In turn, a plurality of locator tabs 214 are provided on the bottom surface of body 202 (see FIGS. 2A and 2C), the purpose of which will also be described infra. As depicted, the locator tabs 214 are disposed offset one from another, although alternative configurations are contemplated.

Figure 2D:
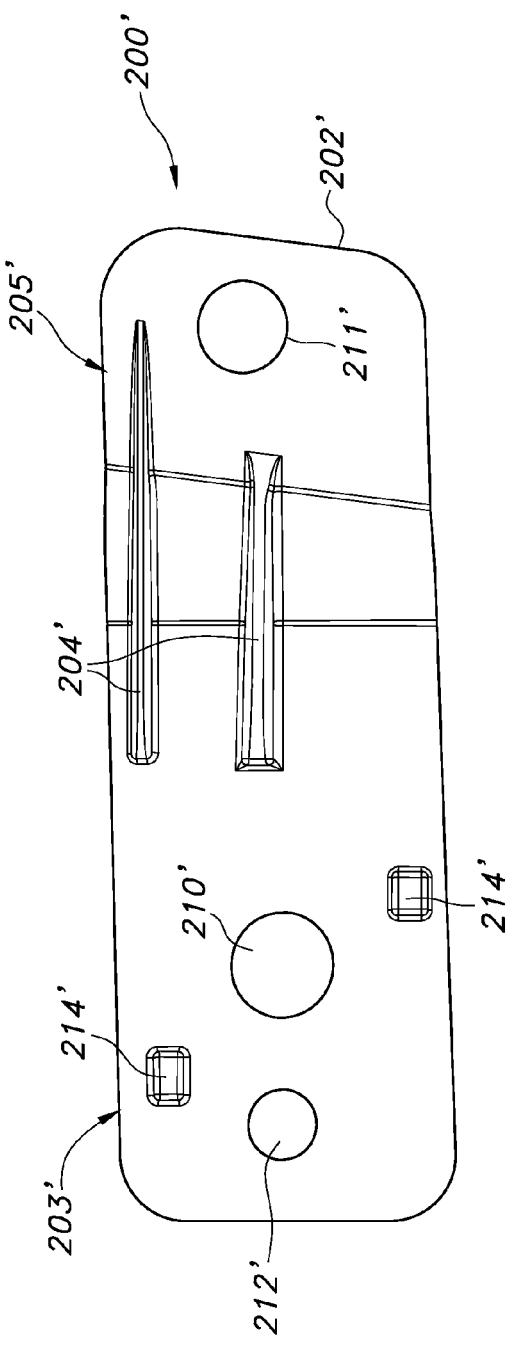
FIG. 2D shows a bottom view of a driver side bracket according to the present disclosure.
Figure 2E:
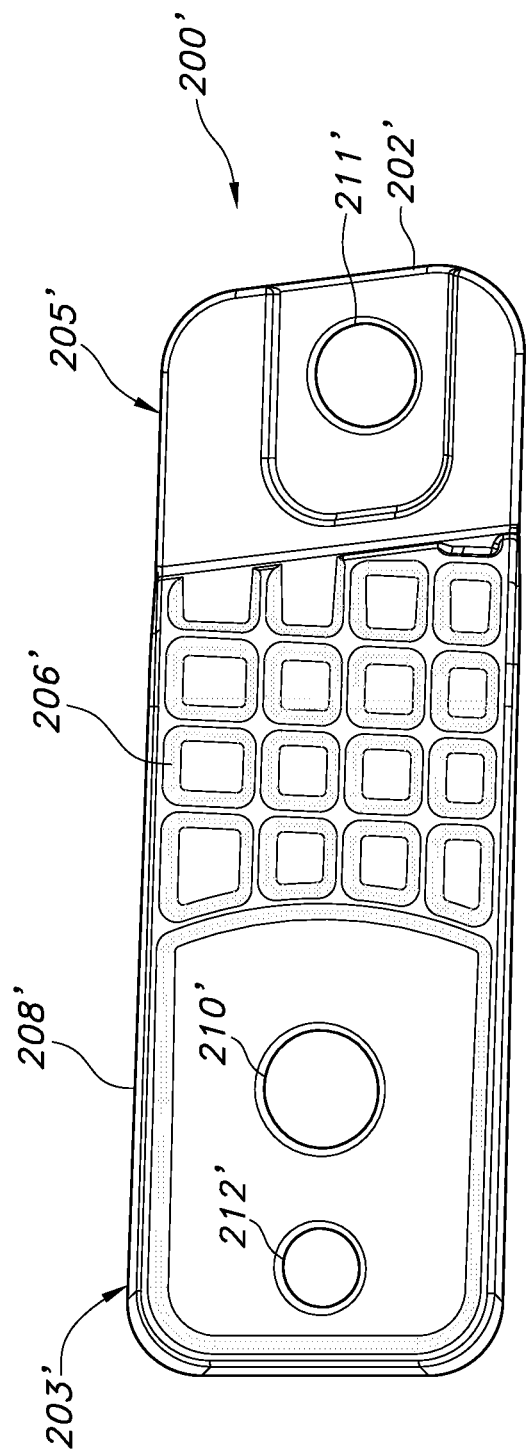
FIG. 2E shows a top view of the bracket of FIG. 2D.

It is noted that in the present description reference is made to a "driver side" bracket and a "passenger side" brackets, i.e. to brackets which are secured to a left side and a right side, respectively, of a vehicle bolster (not shown in this view). The disclosed "driver side" and "passenger side" bracket are substantially similar, and thus the specific features of the brackets of FIGS. 2D and 2E, being in the disclosed embodiment substantially mirror images of the bracket of FIGS. 2A-2C, need not be described in detail. However, the skilled artisan will readily appreciate that the described bracket could easily be modified for use in either or both of the right and left hand side of a vehicle bolster.

Figure 3A:
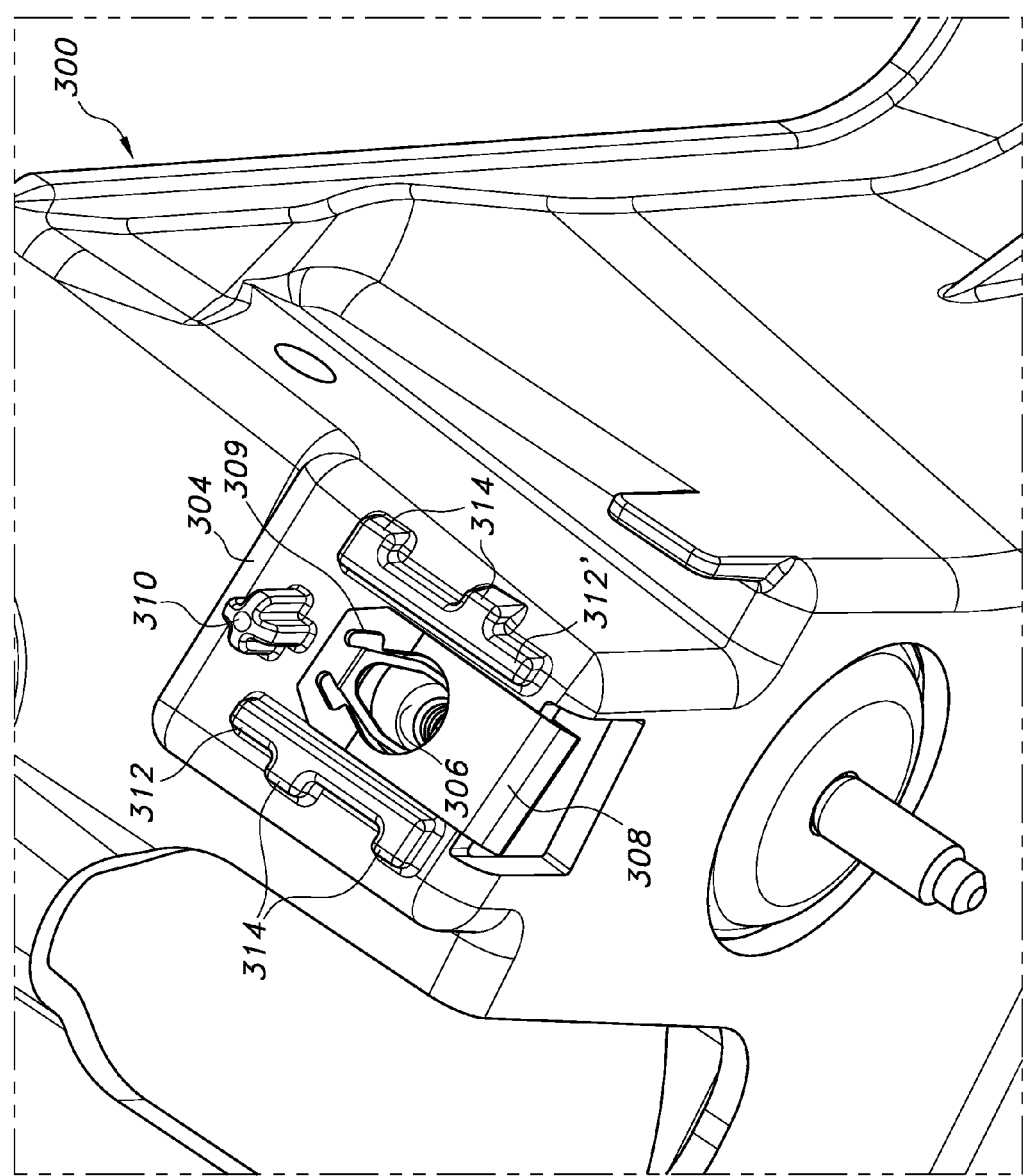
FIG. 3A shows a bracket-receiving portion of a vehicle bolster for use in a fascia securing system according to the present disclosure, including a locator system for the disclosed bracket.
Figure 3B:
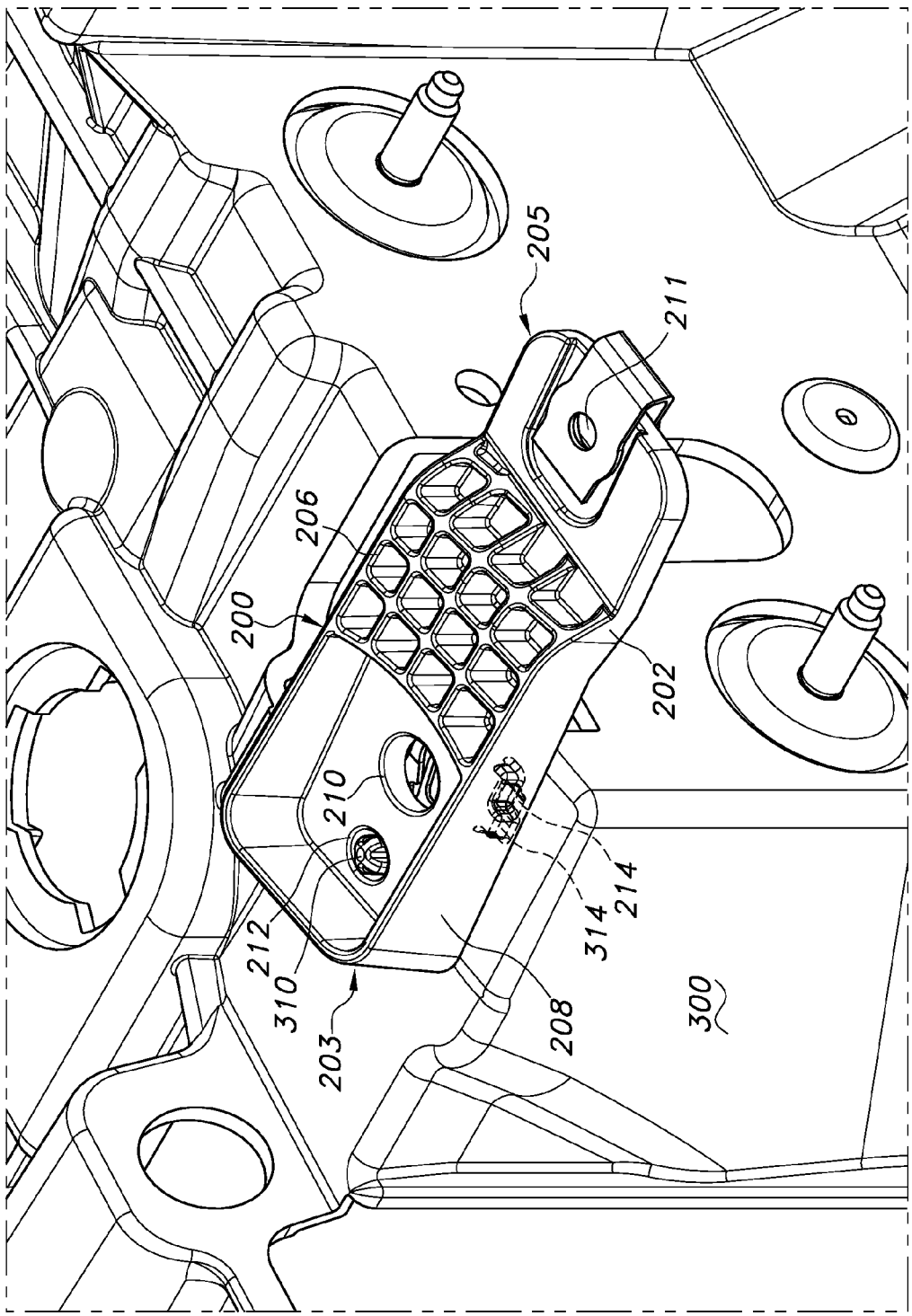
FIG. 3B shows the bracket of FIGS. 2A-2C positioned on the bolster bracket-receiving portion of FIG. 3A.

Turning now to FIG. 3A, a vehicle bolster 300 is depicted therein to which brackets 200, 200' as described above are secured. The bolster 300 a pair of bracket-receiving portions 304 for receiving brackets 200, 200', the bracket-receiving portions 304 including various locator and retention features.

A threaded aperture 306 is included in bracket-receiving portion 304, for receiving a fastener (not shown) passing through the bracket body through-bore 210. A variety of suitable alternative or additional structures for receiving and releasably securing a fastener are known and contemplated for use herein, for example a clip 308 as shown. In turn, optionally a second clip 309 may be associated with aperture 306, to provide additional retention of bracket 200 (not shown in this view). As an example, this can be advantageous when it is desired to remove a fastener such as a bolt securing bracket 200 to bracket-receiving portion 304 without risking losing that bracket. Even without a fastener such as a bolt, bracket 200 is at least loosely retained on bracket-receiving portion 304 until fully removed.

Bracket-receiving portion 304 also includes a locator pin 310, in the depicted embodiment being a four-way locator. Locator pin 310 is dimensioned to engage locator receiver 212 in bracket body 202. In turn, bracket-receiving portion 304 also includes opposed trend-setting ribs 312, 312', being positioned in the depicted embodiment as substantially mirror images one to the other. Each trend-setting rib 312, 312' includes a plurality of anti-locking tabs 314 for releasably engaging locator tabs 214 of a bracket body 202, 202'. As will be appreciated, a height dimension of trend-setting ribs 312, 312' may be adjusted as needed in order to match a horizontal plane of a bracket fascia-engaging portion 205 to a horizontal plane of a fascia 102 portion secured to the fascia-engaging portion in the assembled vehicle V.

Turning to FIG. 3C, in use a bracket 200 is placed on bracket-receiving portion 304 (obscured in this view), whereby the engagement of bolster locator pin 310/bracket locator receiver 212 and of bolster anti-locking tab 314/bracket locator tab 214 allow bracket 200 to substantially self-position in the desired location by controlling movement of the bracket 200 in the x, y, and z (by ribs 312, 312' tabs 314) directions. A suitable fastener 316 (not shown in this view, but see FIG. 4) may then be passed through bracket through-bore 210 to secure the bracket to the bolster 300. Of course, this process is repeated with a second bracket 200' on the opposed side (not shown) of bolster body 302.

Turning to FIG. 4, as shown a birds beak area 110 of a vehicle fascia can then be secured to the bracket fascia-engaging portion 205 (not visible in this view) by any suitable fastener 316. Again, the process is repeated with a second bracket on the opposed side (not shown) of bolster body 302 to secure the opposed birds beak area 110 of the fascia.

As will be appreciated by the skilled artisan, by the foregoing described reinforced bracket 200/bolster 300 assembly, a system is provided for securing a vehicle fascia 102 to a bolster body 302, and in particular for securing a birds beak area 110 of the fascia in a manner providing a secure and snug fit and a desired flushness of margin for a seam defined between the fascia and the vehicle hood, and also between the fascia and the vehicle headlamp assembly. The bracket 200 is compact, robust, and easy to manufacture, and by the structural features described above provides a bracket that does not exceed a desired level of deflection in use. Still more, simply by use of a pair of brackets as described, the cost of conventional means for securing a fascia birds beak area 110, such as sonic welding, is eliminated.

Advantageously, the described system allows securing a vehicle fascia birds beak area 110 to the vehicle without any element of engaging the vehicle headlamp assembly 108. Instead, the birds beak area 110 is secured directly to the bolster. By this expedient, any movement/shifting of the headlamp assembly 108 is isolated and independent of the fascia 102 attachment, and so headlamp 108 movement/vibration/shifting does not affect fascia 102 movement and a tighter margin is achievable.

Moreover, the self-locating features of the system as described above improve ease of servicing, for example for repairs/maintenance requiring loosening or removal of the fascia. For example, a bolt 316 can be removed from the bracket bolster-engaging portion 203, and bolt 316 can be loosened from the bracket fascia-engaging portion 205, and bracket 200 can simply be rotated aside for repair/maintenance, for example for latch servicing. Then, by the various self-locating features as described above, the bracket 200 is easily returned to the desired position and secured in place.

Obvious modifications and variations are possible in light of the above teachings. All such modifications and variations are within the scope of the appended claims when interpreted in accordance with the breadth to which they are fairly, legally and equitably entitled.

What is claimed:

1. A bracket for connecting a vehicle fascia element directly to a vehicle front end module bolster without engaging a vehicle headlamp assembly, comprising:
    a fascia-engaging portion; and
    a bolster-engaging portion including one or more locator structures configured for engaging cooperating structures disposed on the bolster to self-orient the bracket in a predetermined orientation,
    whereby any movement of the vehicle headlamp assembly is independent of movement of the vehicle fascia element.

2. The bracket of claim 1, wherein the vehicle fascia element is a birds beak portion of the vehicle fascia.

3. The bracket of claim 1, wherein the locator structures include a locator receiver configured for engaging a cooperating pin disposed on a portion of the bolster.

4. The bracket of claim 1, wherein the locator structures include one or more locator tabs disposed on a bottom surface of the bracket and configured for engaging one or more cooperating structures disposed on the vehicle bolster.

5. The bracket of claim 1, including one or more reinforcing structures.

6. The bracket of claim 5, wherein the one or more reinforcing structures include one or more reinforcing ribs disposed on a bottom surface of the bracket.

7. The bracket of claim 5, wherein the one or more reinforcing structures include a reinforced midsection.

8. The bracket of claim 7, wherein the reinforced midsection comprises a plurality of ribs defining a honeycomb structure.

9. A vehicle front end module bolster having a bracket-engaging portion comprising one or more locator structures configured for engaging cooperating structures disposed on a bracket to self-orient the bracket in a predetermined orientation, wherein the locator structures include one or more ribs configured for restricting movement of the bracket in a Z direction.

10. The bolster of claim 9, wherein the locator structures include a locator pin configured for engaging a cooperating receiver disposed on the bracket.

11. The bolster of claim 10, wherein the locator pin is a four-way locator pin.

12. The bolster of claim 9, wherein the ribs include one or more tabs configured for releasably engaging cooperating tabs disposed on a bottom surface of the bracket.

13. A vehicle including the bolster of claim 9.

14. An attachment system for connecting a vehicle fascia birds beak element to a vehicle front end module bolster, comprising:
    a bracket including a fascia-engaging portion and a bolster-engaging portion, the bolster-engaging portion including one or more bracket locator structures configured for engaging cooperating structures disposed on the bolster to self-orient the bracket in a predetermined orientation;
    a vehicle front end module bolster having a bracket-engaging portion comprising one or more bolster locator structures configured for engaging cooperating structures disposed on the bracket to self-orient the bracket in a predetermined orientation; and
    one or more bracket bolster-engaging portion locator tabs disposed on a bottom surface of the bracket and configured for engaging one or more cooperating bolster bracket-engaging ribs to restrict movement of the bracket in a Z direction.

15. The attachment system of claim 14, including a bracket bolster-engaging portion locator receiver disposed on the bracket and configured for engaging a cooperating locator pin disposed on the bolster bracket-engaging portion.

16. The attachment system of claim 15, wherein the locator pin is a four-way locator pin.

17. The attachment system of claim 14, wherein the one or more cooperating bolster bracket-engaging ribs include one or more tabs configured for releasably engaging the one or more bracket bolster-engaging portion locator tabs.

18. A vehicle including the attachment system of claim 14.

* * * * *